US012639307B2

(12) United States Patent
Humphreys et al.

(10) Patent No.: US 12,639,307 B2
(45) Date of Patent: May 26, 2026

(54) LARGE-SCALE RETRIEVAL AUGMENTED REINFORCEMENT LEARNING

(71) Applicant: GDM Holding LLC, Mountain View, CA (US)

(72) Inventors: Peter Conway Humphreys, London (GB); Arthur Clement Guez, London (GB)

(73) Assignee: GDM Holding LLC, Mountian View, CA (US)

( * ) Notice: Subject to any disclaimer, the term of this patent is extended or adjusted under 35 U.S.C. 154(b) by 0 days.

(21) Appl. No.: 18/867,222

(22) PCT Filed: May 19, 2023

(86) PCT No.: PCT/EP2023/063492

§ 371 (c)(1),
(2) Date: Nov. 19, 2024

(87) PCT Pub. No.: WO2023/222885

PCT Pub. Date: Nov. 23, 2023

(65) Prior Publication Data

US 2025/0335439 A1    Oct. 30, 2025

Related U.S. Application Data

(60) Provisional application No. 63/344,008, filed on May 19, 2022.

(51) Int. Cl.
G06F 16/2453         (2019.01)

(52) U.S. Cl.
CPC ............................. G06F 16/24542 (2019.01)

(58) Field of Classification Search
CPC . G06F 16/24542; G06F 16/908; G06N 3/006; G06N 3/0442; G06N 3/0455;

(Continued)

(56) References Cited

U.S. PATENT DOCUMENTS

2019/0354869 A1    11/2019  Warde-Farley et al.
2020/0125586 A1*    4/2020  Rezaeian ................ G06F 3/048
(Continued)

OTHER PUBLICATIONS

Aytar et al., "Playing hard exploration games by watching YouTube," Paper, Presented at the Thirty-Second Annual Conference on Neural Information Processing Systems (NIPS), Montreal, Canada, Dec. 2-8, 2018; Advances in Neural Information Processing Systems 31, 2018, 12 pages.

(Continued)

*Primary Examiner* — Dangelino N Gortayo
(74) *Attorney, Agent, or Firm* — Fish & Richardson P.C.

(57)         ABSTRACT

Methods, systems, and apparatus, including computer programs encoded on a computer storage medium, for controlling a reinforcement learning agent in an environment to perform a task. In one aspect, a method comprises: maintaining a retrieval dataset that stores a plurality of history observations and, for each history observation, a respective associated context; receiving a current observation characterizing a current state of the environment; selecting one or more history observations from the plurality of history observations; processing, using an encoder neural network and in accordance with current values of encoder network parameters, an encoder network input comprising (i) the current observation and (ii) the one or more selected history observations and their respective associated context to generate a latent state representation for the current state of the environment; and using the latent state representation to determine an action to be performed by the agent in response to the current observation.

26 Claims, 6 Drawing Sheets

(58) Field of Classification Search
CPC .... G06N 3/0464; G06N 3/0495; G06N 3/084;
G06N 3/092
See application file for complete search history.

(56) References Cited

U.S. PATENT DOCUMENTS

| | | | | |
|---|---|---|---|---|
| 2020/0195652 | A1* | 6/2020 | Carnahan | G06N 20/00 |
| 2020/0341976 | A1* | 10/2020 | Aggarwal | G06F 16/90332 |
| 2021/0182697 | A1* | 6/2021 | Singh | G06F 16/258 |
| 2022/0277031 | A1* | 9/2022 | Quamar | G06F 16/90332 |
| 2023/0118240 | A1* | 4/2023 | Wong | G06N 3/08 |
| | | | | 705/44 |

OTHER PUBLICATIONS

AssaAbloy.com [online], "The DeepMind JAX Ecosystem," Oct. 1, 2023, retrieved on Jan. 15, 2025, retrieved from URL <https://github.com/google-deepmind>, 3 pages.
Atkeson et al., "Locally weighted learning for control," Artificial Intelligence Review, 1997, 11:75-113.
Barreto et al., "Practical Kernel-Based Reinforcement Learning," The Journal of Machine Learning Research, Apr. 2016, 17(1):2372-2441.
Baudiš et al., "PACHI: State of the Art Open Source Go Program," Paper, Presented at the 13th International Conference, Tilburg, The Netherlands, Nov. 20-22, 2011; Revised Selected Papers Advances in Computer Games, 2012, pp. 24-38.
Blundell et al., "Model-Free Episodic Control," CoRR, Submitted on Jun. 14, 2016, arXiv:1606.04460v1, 12 pages.
Borgeaud et al., "Improving language models by retrieving from trillions of tokens," CoRR, Submitted on Dec. 8, 2021, arXiv:2112.04426v1, 43 pages.
Coulom, "Efficient Selectivity and Backup Operators in Monte-Carlo Tree Search," Paper, Presented at the 5th International Conference on Computers and Games, Turin, Italy, May 29-31, 2006; Computers and Games, 2007, pp. 72-83.
De Haan et al., "Causal Confusion in Imitation Learning," Paper, Presented at the Thirty-Third Annual Conference on Neural Information Processing Systems (NIPS), Vancouver, Canada, Dec. 8-14, 2019; Advances in Neural Information Processing Systems 32, 2019, 12 pages.
Goyal et al., "Retrieval-Augmented Reinforcement Learning," CoRR, Mar. 9, 2022, arXiv:2202.08417v2, 27 pages.
Guo et al., "Accelerating Large-Scale Inference with Anisotropic Vector Quantization," Paper, Presented at the Proceedings of the 37th International Conference on Machine Learning, Virtual, Jul. 13-18, 2020; PMLR, 2020, 119:3887-3896.
Guu et al., "REALM: Retrieval-Augmented Language Model Pre-Training," CoRR, Submitted on Feb. 10, 2020, arXiv:2002.08909v1, 12 pages.
Hansen et al., "Fast deep reinforcement learning using online adjustments from the past," Paper, Presented at the Thirty-Second Annual Conference on Neural Information Processing Systems, Montreal, Canada, Dec. 2-8, 2018; Advances in Neural Information Processing Systems 31, 2018, 11 pages.
He et al., "Identity Mappings in Deep Residual Networks," Paper, Presented at the 14th European Conference on Computer Vision, Amsterdam, The Netherlands, Oct. 11-14, 2016; Computer Vision—ECCV 2016, Springer, 2016, pp. 630-645.
International Preliminary Report on Patentability in International Appln. No. PCT/EP2023/063492, dated Nov. 7, 2024, 9 pages.
International Search Report and Written Opinion in International Appln. No. PCT/EP2023/063492, dated Jul. 24, 2023, 15 pages.
Jain et al., "Semiparametric Reinforcement Learning," Workshop Submission, Presented at the Sixth International Conference on Learning Representations, Vancouver, Canada, Apr. 30-May 3, 2018; OpenReview, Feb. 2018, 6 pages.
Jouppi et al., "In-Datacenter Performance Analysis of a Tensor Processing Unit," Paper, Presented at the Proceedings of the 44th Annual International Symposium on Computer Architecture, Toronto, Canada, Jun. 24-28, 2017; Association for Computing Machinery, Jun. 2017, pp. 1-12.
Kigma et al., "Adam: A Method for Stochastic Optimization," CoRR, Submitted on Dec. 22, 2014, arXiv:1412.6980v1, 9 pages.
Lampinen et al., "Towards mental time travel: a hierarchical memory for reinforcement learning agents," Paper, Presented at the Thirty-Fifth Annual Conference on Neural Information Processing Systems, Virtual, Dec. 6-14, 2021; Advances in Neural Information Processing Systems 34, 2021, 14 pages.
Lengyel et al., "Hippocampal Contributions to Control: The Third Way," Paper, Presented at the Twenty-First Annual Conference on Neural Information Processing Systems, Vancouver, Canada, Dec. 3-8, 2007; Advances in Neural Information Processing Systems 20, 2007, 8 pages.
Levine et al., "Offline Reinforcement Learning: Tutorial, Review, and Perspectives on Open Problems," CoRR, Submitted on Nov. 1, 2020, arXiv:2005.01643v3, 43 pages.
Lin et al., "Episodic Memory Deep Q-Networks," CoRR, Submitted on May 19, 2018, arXiv:1805.07603v1, 7 pages.
Lin, "Self-improving reactive agents based on reinforcement learning, planning and teaching," Machine Learning, May 1992, 8:293-321.
Martin et al., "The kNN-TD Reinforcement Learning Algorithm," Paper, Presented at the IWINAC '09: Proceedings of the 3rd International Work-Conference on The Interplay Between Natural and Artificial Computation, Santiago de Compostela, Spain, Jun. 22-26, 2009; Springer-Verlag Berlin Heidelberg, Jun. 2009, pp. 305-314.
Mnih et al., "Human-level control through deep reinforcement learning," Nature, Feb. 2015, 518(7540):529-533.
Oh et al., "Control of Memory, Active Perception, and Action in Minecraft," Paper, Presented at the Proceedings of The 33rd International Conference on Machine Learning, New York, New York, Jun. 19-24, 2016; PMLR, 2016, 48:2790-2799.
Ormoneit et al., "Kernel-Based Reinforcement Learning," Machine Learning, Nov. 2002, 49:161-178.
Parisotto et al., "Stabilizing Transformers for Reinforcement Learning," Paper, Presented at the Thirty-Seventh International Conference on Machine Learning, Virtual, Jul. 12-18, 2020; PMLR, 2020, pp. 7487-7498.
Pritzel et al., "Neural Episodic Control," Paper, Presented at the Proceedings of the 34th International Conference on Machine Learning, Sydney, Australia, Aug. 6-11, 2017; PMLR, 2017, 70:2827-2836.
Ram et al., "Continuous case-based reasoning," Artificial Intelligence, Feb. 1997, 90(1-2):25-77.
Reed et al., "A Generalist Agent," CoRR, Submitted on Nov. 11, 2022, arXiv:2205.06175v3, 42 pages.
Riedmiller, "Neural Fitted Q Iteration—First Experiences with a Data Efficient Neural Reinforcement Learning Method," Paper, Presented at the 16th European Conference on Machine Learning, Porto, Portugal, Oct. 3-7, 2005; Machine Learning: ECML 2005, Springer, 2005, pp. 317-328.
Ritter et al., "Been There, Done That: Meta-Learning with Episodic Recall," Paper, Presented at the Proceedings of the 35th International Conference on Machine Learning, Stockholm, Sweden, Jul. 10-15, 2018; PMLR, 2018, 80:4354-4363.
Ritter et al., "Rapid Task-Solving in Novel Environments," CoRR, Submitted on Jun. 5, 2020, arXiv:2006.03662v1, 16 pages.
Rosin, "Multi-armed bandits with episode context," Annals of Mathematics and Artificial Intelligence, Aug. 2011, 61:203-230.
Schrittwieser et al., "Mastering Atari, Go, Chess and Shogi by Planning with a Learned Model," CoRR, Submitted on Feb. 21, 2020, arXiv:1911.08265v2.
Schrittwieser et al., "Mastering Atari, Go, chess and shogi by planning with a learned model," Nature, Dec. 2020, 588(7839):604-609.
Schrittwieser et al., "Online and Offline Reinforcement Learning by Planning with a Learned Model," Paper, Presented at the Thirty-Fifth Annual Conference on Neural Information Processing Systems, Virtual, Dec. 6-14, 2021; Advances in Neural Information Processing Systems 34, 2021, 12 pages.

(56)                     References Cited

OTHER PUBLICATIONS

Schulman et al., "Trust Region Policy Optimization," Paper, Presented at the Proceedings of the 32nd International Conference on Machine Learning, Lille, France, Jul. 6-11, 2015; PMLR, 2015, 37:1889-1897.

Shrestha et al., "DeepAveragers: Offline Reinforcement Learning by Solving Derived Non-Parametric MDPs," CoRR, Submitted on Oct. 18, 2020, arXiv:2010.08891v1, 21 pages.

Silver et al., "A general reinforcement learning algorithm that masters chess, shogi, and Go through self-play," Science, Dec. 2018, 362(6419):1140-1144.

Sprechmann et al., "Memory-based Parameter Adaptation," CoRR, Submitted on Feb. 28, 2018, arXiv:1802.10542v1, 16 pages.

Wayne et al., "Unsupervised Predictive Memory in a Goal-Directed Agent," CoRR, Submitted on Mar. 28, 2018, arXiv:1803.10760v1, 57 pages.

Xu et al., "VLM: Task-agnostic Video-Language Model Pre-training for Video Understanding," CoRR, Submitted on Sep. 30, 2021, arXiv:2105.09996v3, 13 pages.

Office Action in European Appln. No. 23726530.1, dated Mar. 12, 2026, 10 pages.

* cited by examiner

Determine a reinforcement learning (RL) loss associated with the batch of transitions　302

Determine one or more updates to the parameter values of the policy neural network　304

Determine one or more updates to the parameter values of the encoder neural network　306

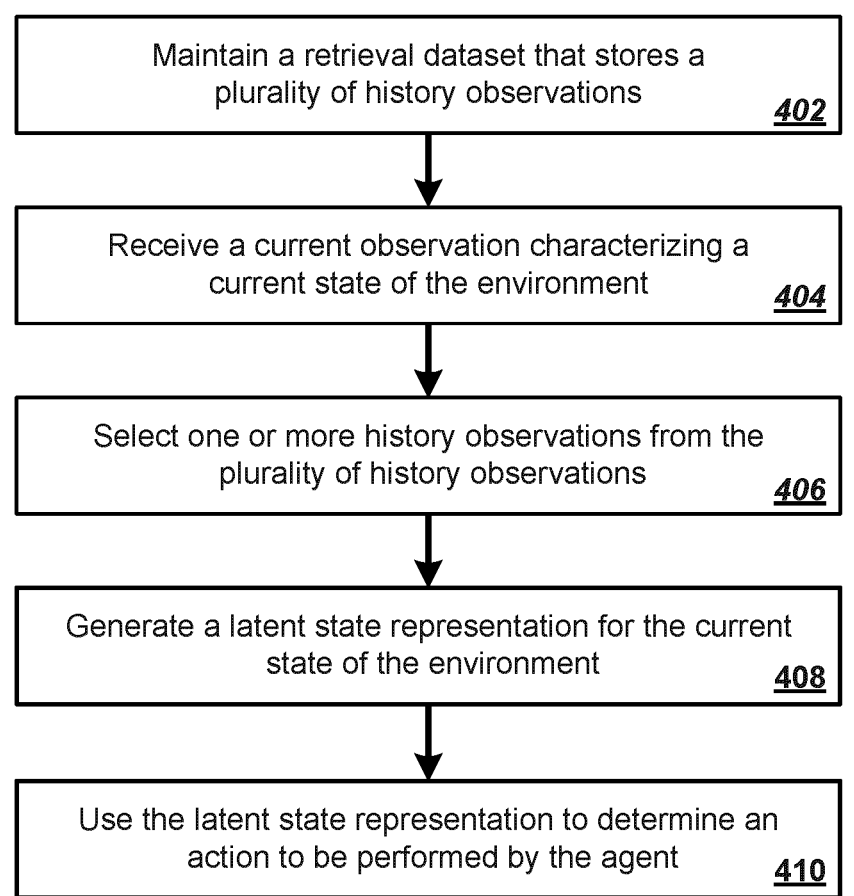

400

Maintain a retrieval dataset that stores a
plurality of history observations    _402_

Receive a current observation characterizing a
current state of the environment    _404_

Select one or more history observations from the
plurality of history observations    _406_

Generate a latent state representation for the current
state of the environment    _408_

Use the latent state representation to determine an
action to be performed by the agent    _410_

FIG. 4

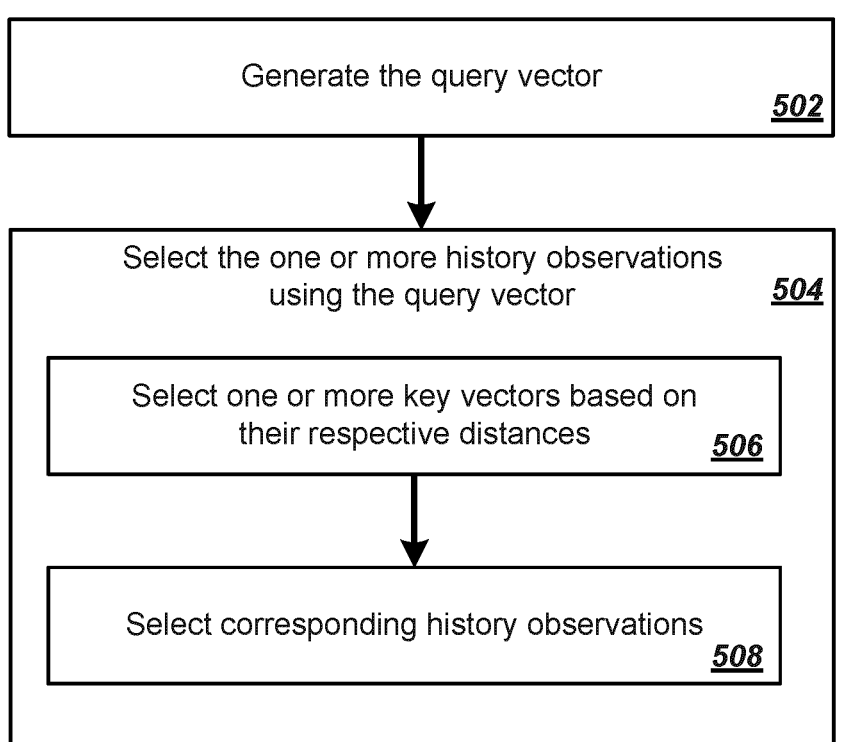
FIG. 5

LARGE-SCALE RETRIEVAL AUGMENTED REINFORCEMENT LEARNING

CROSS-REFERENCE TO RELATED APPLICATIONS

This application is a National Stage Application under 35 U.S.C. § 371 and claims the benefit of International Application No. PCT/EP2023/063492, filed May 19, 2023, which claims priority to U.S. Provisional Application No. 63/344, 008, filed on May 19, 2022. The disclosure of the prior application is considered part of and is incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a reinforcement learning system that controls an agent interacting with an environment using a retrieval-augmented action selection process. Specifically, the reinforcement learning system as described in this specification augments the action selection process, i.e., augments each inference computation of an action selection output from a current observation of the environment, by using a learned retrieval process to retrieve relevant experience data from a retrieval dataset, and subsequently processing data representing the retrieved data to generate the action selection output.

According to an aspect, there is provided a computer-implemented method for controlling a reinforcement learning agent in an environment to perform a task, the method comprising: maintaining a retrieval dataset that stores a plurality of history observations and, for each history observation, a respective associated context, wherein each history observation characterizes a respective history state of the environment and the respective associated context for each history observation characterizes one or more actions that were performed in response to the history observation; receiving a current observation characterizing a current state of the environment; selecting one or more history observations from the plurality of history observations, comprising: generating a query vector for the current observation, comprising: processing the current observation using an embedding neural network to generate an embedding and processing the embedding to generate the query vector, and selecting the one or more history observations from the plurality of history observations using the query vector; and processing, using an encoder neural network and in accordance with current values of encoder network parameters, an encoder network input comprising (i) the current observation and (ii) the one or more selected history observations and their respective associated context to generate a latent state representation for the current state of the environment; and using the latent state representation to determine an action to be performed by the agent in response to the current observation.

The associated context of each history observation may comprise one or both of: a history action performed in response to the history observation, or a history reward received in response to the history action being performed.

The associated context of each history observation may further comprise one or both of: a history final observation characterizing a terminal state in a trajectory that includes the history observation, a history final reward received by the agent in the trajectory that includes the history observation.

Processing the embedding to generate the query vector may comprise: processing the embedding by using principal component analysis.

Each history observation stored in the retrieval dataset may be associated with a corresponding key vector that is generated by using the embedding neural network.

Selecting the one or more history observations from the plurality of history observations may comprise: selecting, from among the key vectors associated with the plurality of history observations, one or more key vectors based on their respective distances from the query vector for the current observation; and selecting, as the one or more selected history observations, corresponding history observations from the plurality of history observations that are associated with the one or more selected key vectors.

Selecting the one or more key vectors may comprise: selecting one or more key vectors having smallest Euclidean distances from the query vector for the current observation.

Selecting the one or more history observations from the plurality of history observations using the query vector may comprise using an approximate nearest neighbor matching technique.

Selecting the one or more history observations from the plurality of history observations using the query vector may comprise using a vector similarity search technique.

The vector similarity search technique may comprise a maximum inner product search technique.

The maximum inner product search technique may comprise an anisotropic quantization-based maximum inner product search technique.

Some or all of the plurality of history observations stored in the retrieval dataset may be generated as a result of the reinforcement learning agent performing one or more different tasks when interacting with the environment.

Some or all of the plurality of history observations stored in the retrieval dataset may each have a different dimension, a different modality, or both than the current observation.

Using the latent state representation to determine the action to be performed by the agent in response to the current observation may comprise: performing a look-ahead search that begins from the current state and searches through a latent state representation space guided by policy network outputs of a policy neural network that is configured to, at each of multiple time steps, process a respective latent state representation for the time step to generate a corresponding policy network output for the time step.

The look ahead search may comprise a Monte-Carlo Tree Search (MCTS) technique.

The policy network output may comprise: a predicted policy output that defines a score distribution over a set of possible actions; and a predicted value output that defines a value representing a predicted long-term reward received by the agent as a result of the environment being in the current state.

Using the latent state representation to determine the action to be performed by the agent in response to the current observation may comprise: selecting, from the set of possible actions, the action to be performed by the agent by using a policy network output of a policy neural network that is configured to process the latent state representation for the current state of the environment to generate the policy network output.

The task may comprise one of: an object manipulation task or an environment navigation task.

The agent may be a mechanical agent, the environment is a real-world environment, and the observation may comprise data from one or more sensors configured to sense the real-world environment.

The encoder neural network may comprise: a first sub network configured to process the current observation to generate a first encoded representation; a second sub network configured to process each of the one or more selected history observations and its respective associated context to generate a respective second encoded representation; and a third sub network configured to process the first encoded representation and the respective second encoded representations to generate the latent state representation.

The encoder neural network may have been trained through reinforcement learning on a training dataset that stores a plurality of trajectories generated as a result of the reinforcement learning agent interacting with the environment.

The retrieval dataset may be the same as the training dataset.

The retrieval dataset may be different from the training dataset and is larger than the training dataset.

The encoder neural network may have been trained through model-based reinforcement learning.

According to another aspect, there is provided one or more computer-readable storage media encoded with instructions that, when executed by one or more computers, cause the one or more computers to perform the operations of the above method aspect.

According to a further aspect, there is provided a system comprising one or more computers and one or more storage devices storing instructions that when executed by one or more computers cause the one or more computers to perform the respective operations of the above method aspect.

The subject matter described in this specification can be implemented in particular embodiments so as to realize one or more of the following advantages. The techniques disclosed in this specification augment the agent control process that uses a policy neural network with an information retrieval process that additionally provides relevant contextual information obtained from a retrieval dataset. In particular, by using fast and efficient approximate nearest neighbor matching to dynamically retrieve relevant information, the described information retrieval process is easily scalable to facilitate large-scale, context-sensitive lookup within tens of millions of pieces of information. This retrieval process thus drastically expands the scale of information that can be made accessible to the agent control process. In principle the system could be trained using these pieces of information, encoding the information in the weights of the system, but it has been found that computational and memory efficiency can be improved using a retrieval process as described. Some implementations of the described techniques also perform a look-ahead search, and this combines synergistically with the described retrieval process.

The retrieval process can be trained end-to-end with the policy neural network and thus allows the policy neural network to incorporate and utilize the relevant information in a learned, i.e., rather than hardcoded, manner when used to generate policy outputs for agent control. In addition, new information can be added to the retrieval dataset as it becomes available to continuously augment the information that can be utilized by the policy neural network, thereby further improving agent control performance without the need of actually retraining the policy neural network. In some examples, this retrieval process can aid in controlling the agent to achieve its task objective faster and more efficiently. In some other examples, this retrieval process can aid in controlling the agent to achieve an optimized task objective, i.e., to maximize expected rewards to be received by the agent.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow diagram of an example process for controlling a reinforcement learning agent.

FIG. 5 is a flow diagram of sub-steps of one of the steps of the process of FIG. 4.

Like reference numbers and designations in the various drawings indicate like elements.

DETAILED DESCRIPTION

Figure 1:
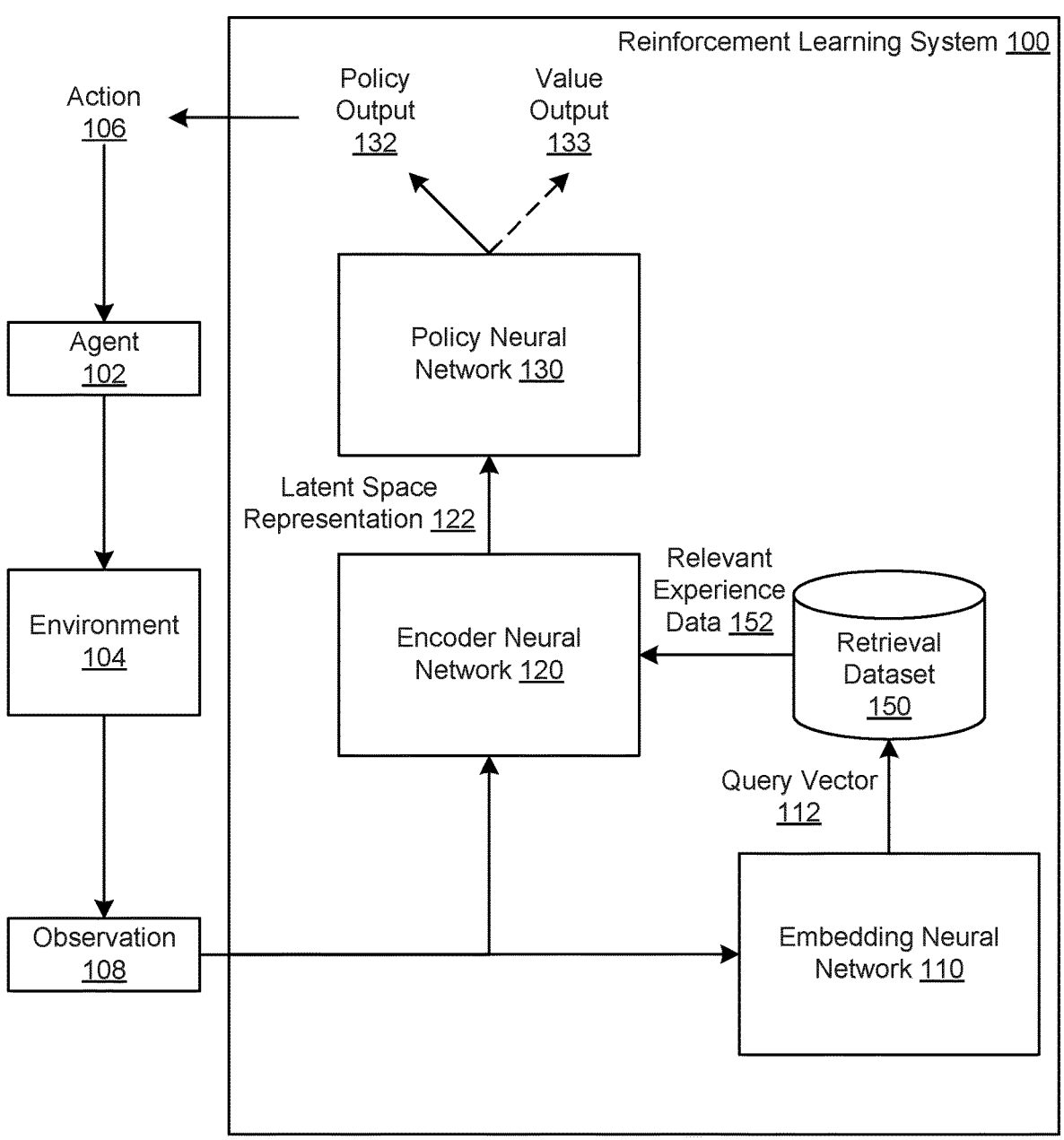
FIG. 1 shows an example reinforcement learning system.

This specification describes a reinforcement learning system that controls an agent interacting with an environment by, at each of multiple time steps, processing data characterizing the current state of the environment at the time step (i.e., an "observation") to select an action to be performed by the agent.

Once the reinforcement learning system selects an action to be performed by the agent, the reinforcement learning system can cause the agent to perform the selected action. For example, the system can instruct the agent and the agent can perform the selected action. As another example, the system can directly generate control signals for one or more controllable elements of the agent. As yet another example, the system can transmit data specifying the selected action to a control system of the agent, which controls the agent to perform the action. Generally, the agent performing the selected action results in the environment transitioning into a different state.

The system described herein is widely applicable and is not limited to one specific implementation. However, for illustrative purposes, a small number of example implementations are described below.

In some implementations, the environment is a real-world environment, the agent is a mechanical agent interacting with the real-world environment, e.g., a robot or an autonomous or semi-autonomous land, air, or sea vehicle operating in or navigating through the environment, and the actions are actions taken by the mechanical agent in the real-world environment to perform the task. For example, the agent may be a robot interacting with the environment to accomplish a specific task, e.g., to locate an object of interest in the environment or to move an object of interest to a specified location in the environment or to navigate to a specified destination in the environment.

In these implementations, the observations may include, e.g., one or more of: images, object position data, and sensor data to capture observations as the agent interacts with the environment, for example sensor data from an image, distance, or position sensor or from an actuator. For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot. In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations. The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control signals to control the robot or other mechanical agent, e.g., torques for the joints of the robot or higher-level control commands, or the autonomous or semi-autonomous land, air, sea vehicle, e.g., torques to the control surface or other control elements e.g. steering control elements of the vehicle, or higher-level control commands. The control signals can include for example, position, velocity, or force/torque/acceleration data for one or more joints of a robot or parts of another mechanical agent. The control signals may also or instead include electronic control data such as motor control data, or more generally data for controlling one or more electronic devices within the environment the control of which has an effect on the observed state of the environment. For example in the case of an autonomous or semi-autonomous land or air or sea vehicle the control signals may define actions to control navigation e.g. steering, and movement e.g., braking and/or acceleration of the vehicle.

In some implementations the environment is a simulation of the above-described real-world environment, and the agent is implemented as one or more computers interacting with the simulated environment. For example the simulated environment may be a simulation of a robot or vehicle and the reinforcement learning system may be trained on the simulation and then, once trained, used in the real-world.

In some implementations the environment is a real-world manufacturing environment for manufacturing a product, such as a chemical, biological, or mechanical product, or a food product. As used herein a "manufacturing" a product also includes refining a starting material to create a product, or treating a starting material e.g. to remove pollutants, to generate a cleaned or recycled product. The manufacturing plant may comprise a plurality of manufacturing units such as vessels for chemical or biological substances, or machines, e.g. robots, for processing solid or other materials. The manufacturing units are configured such that an intermediate version or component of the product is moveable between the manufacturing units during manufacture of the product, e.g. via pipes or mechanical conveyance. As used herein manufacture of a product also includes manufacture of a food product by a kitchen robot.

The agent may comprise an electronic agent configured to control a manufacturing unit, or a machine such as a robot, that operates to manufacture the product. That is, the agent may comprise a control system configured to control the manufacture of the chemical, biological, or mechanical product. For example the control system may be configured to control one or more of the manufacturing units or machines or to control movement of an intermediate version or component of the product between the manufacturing units or machines.

As one example, a task performed by the agent may comprise a task to manufacture the product or an intermediate version or component thereof. As another example, a task performed by the agent may comprise a task to control, e.g. minimize, use of a resource such as a task to control electrical power consumption, or water consumption, or the consumption of any material or consumable used in the manufacturing process.

The actions may comprise control actions to control the use of a machine or a manufacturing unit for processing a solid or liquid material to manufacture the product, or an intermediate or component thereof, or to control movement of an intermediate version or component of the product within the manufacturing environment e.g. between the manufacturing units or machines. In general the actions may be any actions that have an effect on the observed state of the environment, e.g. actions configured to adjust any of the sensed parameters described below. These may include actions to adjust the physical or chemical conditions of a manufacturing unit, or actions to control the movement of mechanical parts of a machine or joints of a robot. The actions may include actions imposing operating conditions on a manufacturing unit or machine, or actions that result in changes to settings to adjust, control, or switch on or off the operation of a manufacturing unit or machine.

The rewards or return may relate to a metric of performance of the task. For example in the case of a task that is to manufacture a product the metric may comprise a metric of a quantity of the product that is manufactured, a quality of the product, a speed of production of the product, or to a physical cost of performing the manufacturing task, e.g. a metric of a quantity of energy, materials, or other resources, used to perform the task. In the case of a task that is to control use a resource the matric may comprise any metric of usage of the resource.

In general observations of a state of the environment may comprise any electronic signals representing the functioning of electronic and/or mechanical items of equipment. For example a representation of the state of the environment may be derived from observations made by sensors sensing a state of the manufacturing environment, e.g. sensors sensing a state or configuration of the manufacturing units or machines, or sensors sensing movement of material between the manufacturing units or machines. As some examples such sensors may be configured to sense mechanical movement or force, pressure, temperature; electrical conditions such as current, voltage, frequency, impedance; quantity, level, flow/movement rate or flow/movement path of one or more materials; physical or chemical conditions e.g. a physical state, shape or configuration or a chemical state such as pH; configurations of the units or machines such as the mechanical configuration of a unit or machine, or valve configurations; image or video sensors to capture image or video observations of the manufacturing units or of the machines or movement; or any other appropriate type of sensor. In the case of a machine such as a robot the observations from the sensors may include observations of position, linear or angular velocity, force, torque or acceleration, or pose of one or more parts of the machine, e.g. data characterizing the current state of the machine or robot or of an item held or processed by the machine or robot. The observations may also include, for example, sensed electronic signals such as motor current or a temperature signal, or image or video data for example from a camera or a LIDAR sensor. Sensors such as these may be part of or located separately from the agent in the environment.

In some implementations the environment is the real-world environment of a service facility comprising a plurality of items of electronic equipment, such as a server farm or data center, for example a telecommunications data center, or a computer data center for storing or processing data, or any service facility. The service facility may also include ancillary control equipment that controls an operating environment of the items of equipment, for example environmental control equipment such as temperature control e.g. cooling equipment, or air flow control or air conditioning equipment. The task may comprise a task to control, e.g. minimize, use of a resource, such as a task to control electrical power consumption, or water consumption. The agent may comprise an electronic agent configured to control operation of the items of equipment, or to control operation of the ancillary, e.g. environmental, control equipment.

In general the actions may be any actions that have an effect on the observed state of the environment, e.g. actions configured to adjust any of the sensed parameters described below. These may include actions to control, or to impose operating conditions on, the items of equipment or the ancillary control equipment, e.g. actions that result in changes to settings to adjust, control, or switch on or off the operation of an item of equipment or an item of ancillary control equipment.

In general observations of a state of the environment may comprise any electronic signals representing the functioning of the facility or of equipment in the facility. For example a representation of the state of the environment may be derived from observations made by any sensors sensing a state of a physical environment of the facility or observations made by any sensors sensing a state of one or more of items of equipment or one or more items of ancillary control equipment. These include sensors configured to sense electrical conditions such as current, voltage, power or energy; a temperature of the facility; fluid flow, temperature or pressure within the facility or within a cooling system of the facility; or a physical facility configuration such as whether or not a vent is open.

The rewards or return may relate to a metric of performance of the task. For example in the case of a task to control, e.g. minimize, use of a resource, such as a task to control use of electrical power or water, the metric may comprise any metric of use of the resource.

In some implementations the environment is the real-world environment of a power generation facility e.g. a renewable power generation facility such as a solar farm or wind farm. The task may comprise a control task to control power generated by the facility, e.g. to control the delivery of electrical power to a power distribution grid, e.g. to meet demand or to reduce the risk of a mismatch between elements of the grid, or to maximize power generated by the facility. The agent may comprise an electronic agent configured to control the generation of electrical power by the facility or the coupling of generated electrical power into the grid. The actions may comprise actions to control an electrical or mechanical configuration of an electrical power generator such as the electrical or mechanical configuration of one or more renewable power generating elements e.g. to control a configuration of a wind turbine or of a solar panel or panels or mirror, or the electrical or mechanical configuration of a rotating electrical power generation machine. Mechanical control actions may, for example, comprise actions that control the conversion of an energy input to an electrical energy output, e.g. an efficiency of the conversion or a degree of coupling of the energy input to the electrical energy output. Electrical control actions may, for example, comprise actions that control one or more of a voltage, current, frequency or phase of electrical power generated.

The rewards or return may relate to a metric of performance of the task. For example in the case of a task to control the delivery of electrical power to the power distribution grid the metric may relate to a measure of power transferred, or to a measure of an electrical mismatch between the power generation facility and the grid such as a voltage, current, frequency or phase mismatch, or to a measure of electrical power or energy loss in the power generation facility. In the case of a task to maximize the delivery of electrical power to the power distribution grid the metric may relate to a measure of electrical power or energy transferred to the grid, or to a measure of electrical power or energy loss in the power generation facility.

In general observations of a state of the environment may comprise any electronic signals representing the electrical or mechanical functioning of power generation equipment in the power generation facility. For example a representation of the state of the environment may be derived from observations made by any sensors sensing a physical or electrical state of equipment in the power generation facility that is generating electrical power, or the physical environment of such equipment, or a condition of ancillary equipment supporting power generation equipment. Such sensors may include sensors configured to sense electrical conditions of the equipment such as current, voltage, power or energy; temperature or cooling of the physical environment; fluid flow; or a physical configuration of the equipment; and observations of an electrical condition of the grid e.g. from local or remote sensors. Observations of a state of the environment may also comprise one or more predictions regarding future conditions of operation of the power generation equipment such as predictions of future wind levels or solar irradiance or predictions of a future electrical condition of the grid.

As another example, the environment may be a chemical synthesis or protein folding environment such that each state is a respective state of a protein chain or of one or more intermediates or precursor chemicals and the agent is a computer system for determining how to fold the protein chain or synthesize the chemical. In this example, the actions are possible folding actions for folding the protein chain or actions for assembling precursor chemicals/intermediates and the result to be achieved may include, e.g., folding the protein so that the protein is stable and so that it achieves a particular biological function or providing a valid synthetic route for the chemical. As another example, the agent may be a mechanical agent that performs or controls the protein folding actions or chemical synthesis steps selected by the system automatically without human interaction. The observations may comprise direct or indirect observations of a state of the protein or chemical/intermediates/precursors and/or may be derived from simulation.

In a similar way the environment may be a drug design environment such that each state is a respective state of a potential pharmaceutically active compound and the agent is a computer system for determining elements of the pharmaceutically active compound and/or a synthetic pathway for the pharmaceutically active compound. The drug/synthesis may be designed based on a reward derived from a target for the drug, for example in simulation. As another example, the agent may be a mechanical agent that performs or controls synthesis of the drug.

In some further applications, the environment is a real-world environment and the agent manages distribution of tasks across computing resources e.g. on a mobile device and/or in a data center. In these implementations, the actions may include assigning tasks to particular computing resources.

As further example, the actions may include presenting advertisements, the observations may include advertisement impressions or a click-through count or rate, and the reward may characterize previous selections of items or content taken by one or more users.

In some cases, the observations may include textual or spoken instructions provided to the agent by a third-party (e.g., an operator of the agent). For example, the agent may be an autonomous vehicle, and a user of the autonomous vehicle may provide textual or spoken instructions to the agent (e.g., to navigate to a particular location).

As another example the environment may be an electrical, mechanical or electro-mechanical design environment, e.g. an environment in which the design of an electrical, mechanical or electro-mechanical entity is simulated. The simulated environment may be a simulation of a real-world environment in which the entity is intended to work. The task may be to design the entity. The observations may comprise observations that characterize the entity, i.e. observations of a mechanical shape or of an electrical, mechanical, or electro-mechanical configuration of the entity, or observations of parameters or properties of the entity. The actions may comprise actions that modify the entity e.g. that modify one or more of the observations. The rewards or return may comprise one or more metric of performance of the design of the entity. For example rewards or return may relate to one or more physical characteristics of the entity such as weight or strength or to one or more electrical characteristics of the entity such as a measure of efficiency at performing a particular function for which the entity is designed. The design process may include outputting the design for manufacture, e.g. in the form of computer executable instructions for manufacturing the entity. The process may include making the entity according to the design. Thus a design an entity may be optimized, e.g. by reinforcement learning, and then the optimized design output for manufacturing the entity, e.g. as computer executable instructions; an entity with the optimized design may then be manufactured.

As previously described the environment may be a simulated environment. Generally in the case of a simulated environment the observations may include simulated versions of one or more of the previously described observations or types of observations and the actions may include simulated versions of one or more of the previously described actions or types of actions. For example the simulated environment may be a motion simulation environment, e.g., a driving simulation or a flight simulation, and the agent may be a simulated vehicle navigating through the motion simulation. In these implementations, the actions may be control inputs to control the simulated user or simulated vehicle. Generally the agent may be implemented as one or more computers interacting with the simulated environment.

The simulated environment may be a simulation of a particular real-world environment and agent. For example, the system may be used to select actions in the simulated environment during training or evaluation of the system and, after training, or evaluation, or both, are complete, may be deployed for controlling a real-world agent in the particular real-world environment that was the subject of the simulation. This can avoid unnecessary wear and tear on and damage to the real-world environment or real-world agent and can allow the control neural network to be trained and evaluated on situations that occur rarely or are difficult or unsafe to re-create in the real-world environment. For example the system may be partly trained using a simulation of a mechanical agent in a simulation of a particular real-world environment, and afterwards deployed to control the real mechanical agent in the particular real-world environment. Thus in such cases the observations of the simulated environment relate to the real-world environment, and the selected actions in the simulated environment relate to actions to be performed by the mechanical agent in the real-world environment.

As another example, in some implementations the agent comprises a digital assistant such as a smart speaker, smart display, or other device and the actions performed by the agent are outputs generated by the digital assistant in response to inputs from a human user that specify the task to be performed. The outputs may be provided using natural language, e.g. on a display and/or using a speech synthesis subsystem of the digital assistant. Visual, e.g. video, and/or audio observations of the user may be captured, e.g. using the digital assistant.

Optionally, in any of the above implementations, the observation at any given time step may include data from a previous time step that may be beneficial in characterizing the environment, e.g., the action performed at the previous time step, the reward received at the previous time step, or both.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 controls an agent 102 interacting with an environment 104 by selecting actions 106 to be performed by the agent 102 and then causing the agent 102 to perform the selected actions 106, such as by transmitting control data to the agent 102 which instructs the agent 102 to perform the action 102. In some other cases the RL system 100 is remote from the agent and transmits the control data or other instructions that cause the agent to execute the actions.

Performance of the selected actions 106 by the agent 102 generally causes the environment 104 to transition into successive new states. By repeatedly causing the agent 102 to act in the environment 104, the system 100 can control the agent 102 to complete a specified task.

The reinforcement learning system 100 includes an encoder neural network 120, a policy neural network 130, which are jointly used to control the agent 102. Optionally, in some implementations, the reinforcement learning system 100 includes or has access to an environment dynamics model that works in tandem with the encoder neural network 120 and policy neural networks 130 to control the agent 102.

The reinforcement learning system 100 also includes a retrieval dataset 150 which stores experience data generated as a consequence of the interaction of the agent 102 or another agent with the environment 104 or with another instance of the environment. Additionally or instead, the retrieval dataset 150 stores experience data derived from environment interaction information obtained from any of a variety of other relevant sources, e.g., driving logs in the case of the agent being an autonomous or semi-autonomous vehicle. For example, the agent may be controlled by the present reinforcement learning system 100 or another control system, including by a human-operated or another machine learning-based control system, by a hard-coded policy that selects actions to be performed by the agent in accordance with pre-programmed logic, or simply by a random policy that selects actions with uniform randomness. Collectively, the experience data stored in the retrieval dataset 150 represents the past experience information of controlling the agent to perform the same or different task(s).

More specifically, the experience data includes a plurality of history observations obtained during the past interaction of the agent 102 or another agent with the environment 104 or with another instance of the environment, and the retrieval dataset 150 stores these history observations in association with respective key vectors. Each history observation characterizes a respective history state of the environment 104 or another instance of the environment. Each history observation may, but need not, have the same dimension or the same data modality as the current observation 108. In general observations with different data modality can refer to observations based on different types of data characterizing a state of the environment, e.g. based on audio vs image vs text data.

For each history observation, the experience data also includes an associated context, which can include any information that is relevant to the specified task that the agent 102 was performing, but may nevertheless be not readily apparent from the history observation itself, among other information. For example, the associated context of each history observation can include data that specifies one or more subsequent history actions that were performed in response to the history observation, one or more subsequent history rewards that were received in response to the subsequent history action(s) being performed, or both. As another example, the associated context of each history observation can include a history final observation characterizing a terminal state in a trajectory that includes the history observation, a history final reward received by the agent in the trajectory that includes the history observation, or both. As yet another example, the associated context of each history observation can include all of or some subset of the example information mentioned above.

A trajectory represents a sequence of interactions of an agent with an environment over a sequence of time steps. For example, a trajectory can represent an episode of the specified task over a sequence of time steps during which the agent attempts to perform the specified task. For example, the task episode can continue for a predetermined number of time steps or until a reward is received that indicates that the task has been successfully completed.

At each of multiple time steps, the reinforcement learning system 100 executes a learned information retrieval process to retrieve the relevant experience data 152 from the retrieval dataset 150 and provides the retrieved data 152 to the encoder neural network 120, i.e., in addition to the current observation 108. As used in this specification, the term "learned" means that a process or a value has been adjusted during the training of the system.

To execute the information retrieval process, the reinforcement learning system 100 uses an embedding neural network 110 to generate a query vector 112 for the current observation 108, and then uses the query vector 112 to select, from the retrieval dataset 150, one or more history observations and their associated context as the relevant experience data 152 to provide to the encoder neural network 150.

In particular, in some implementations, this selection process leverages a fast, (approximate) nearest neighbor matching between the query vector and the key vectors to facilitate large-scale retrieval, namely the selection of relevant experience data from a very large retrieval dataset, e.g., one that includes tens of millions of, or more, history observations together with their associated context. The relevant experience data 152 selected by this information retrieval process thus, by virtue of its diversity, enables better agent control by flexibly relating past experiences and relevant contextual information to the present task.

The encoder neural network 120 is configured to process, at each of multiple time steps, an encoder network input that includes (i) the current observation 108 characterizing the current state of the environment 104 at the given time step and (ii) the relevant experience data 152 to generate a latent state representation 122 for the current state of the environment 104.

This latent state representation 122 and, in some implementations, action data defining each action from the set of possible actions (or data derived from the action data or both) can then be provided as input to the policy neural network 130 for processing to generate a policy network output.

The policy network output includes a policy output 132 and, optionally, a value output 133.

The value output 133, when provided, represents a value estimate of the environment 104 being in the current state to successfully performing the specified task. For example, the value estimate may be an estimate of the return for the task resulting from the environment 104 being in a current state characterized by the observation 108. A return refers to a cumulative measure of "rewards" received by the agent, for example, a time-discounted sum of rewards. The value output 133 may be used, e.g., for performing a look-ahead search using the latent state representation 122 to determine the action to be performed by the agent.

The reinforcement learning system 100 then uses the policy output 132 to select the action 106 to be performed by the agent 102 at the current time step.

In some implementations, the policy output 132 generated by the policy neural network 130 for a time step is directly used to select the action 106 to be performed by the agent 102 at the current time step. A few examples of using the policy output 132 to select the action 106 to be performed by the agent 102 are described next.

In one example, the policy output 132 may include a respective numerical probability value for each action in a set of possible actions that can be performed by the agent. The system can select the action to be performed by the agent, e.g., by sampling an action in accordance with the probability values for the actions, or by selecting the action with the highest probability value.

In another example, the policy output 132 may directly define the action to be performed by the agent, e.g., by defining the values of torques that should be applied to the joints of a robotic agent.

In another example, the policy output 132 may include a respective Q-value for each action in the set of possible actions that can be performed by the agent. The system can process the Q-values (e.g., using a soft-max function) to generate a respective probability value for each possible action, which can be used to select the action to be performed by the agent (as described earlier). The system could also select the action with the highest Q-value as the action to be performed by the agent.

The Q value for an action is an estimate of a "return" that would result from the agent performing the action in response to the current observation and thereafter selecting future actions performed by the agent in accordance with current values of the policy neural network parameters.

A return refers to a cumulative measure of "rewards" received by the agent, for example, a time-discounted sum of rewards. The agent can receive a respective reward at each time step, where the reward is specified by a scalar numerical value and characterizes, e.g., a progress of the agent towards completing an assigned task.

In some cases, the system also receives an extrinsic reward for the task ("task reward") from the environment. Generally, the extrinsic reward is a scalar numerical value and characterizes a progress of the agent towards completing the task. As a particular example, the extrinsic reward can be a sparse binary reward that is zero unless the task is successfully completed and one if the task is successfully completed as a result of the action performed. As another particular example, the extrinsic reward can be a dense reward that measures a progress of the agent towards completing the task as of individual observations received during the episode of attempting to perform the task, i.e., so that non-zero rewards can be and frequently are received before the task is successfully completed.

In some cases, the system 100 can select the action to be performed by the agent in accordance with an exploration policy. For example, the exploration policy may be an $\epsilon$-greedy exploration policy, where the system selects the action to be performed by the agent in accordance with the policy output 132 with probability $1-\epsilon$, and randomly selects the action with probability $\epsilon$. In this example, $\epsilon$ is a scalar value between 0 and 1.

In some other implementations, rather than directly using the policy output 132 to control the agent 102, the system 100 instead perform a plurality of planning iterations guided by the policy outputs 132 and, when provided, the value outputs 133 of the policy neural network 130, and then selects the action 106 to be performed in response to the current observation 108 based on the results of the planning iterations. Each planning iteration generally involves performing a look ahead search, e.g., a tree-based look-ahead search algorithm, e.g., a Monte Carlo tree search (MCTS) algorithm, to repeatedly (i.e., at each of multiple planning steps of each planning iteration) select a sequence of actions that progress the environment to new states starting from the state represented by the current observation. This allows for the system to search through a latent state representation space starting from the current state characterized by the current observation 108. For example the look-ahead search can be guided by the policy network outputs by searching through the latent state representation space, representing states of the environment, using the policy outputs 132 and, when provided, the value outputs 133 of the policy neural network 130, using the policy outputs 132 to identify potential future actions, and optionally using the value outputs 133 to evaluate the states of the environment, e.g. a terminal search state of the environment.

The system 100 can run the look-ahead search algorithm using the policy outputs 132 and, in some cases, the value output 133 together with an environment dynamics model to determine which actions to be performed by the agent can be selected. The environment dynamics model is a model which, given information at a given time step, is able to make a prediction about at least one future time. When used, the environment dynamics model can make a prediction about multiple time steps after the given time step. For example, the environment dynamics model can be configured to receive as input the latent state representation 122 corresponding to the current observation 108 and data specifying the current action 106 selected by using the policy output 132 and value output 133 and to generate as output a predicted feature latent state representation that would be generated by the encoder neural network 120 for the next observation characterizing the next state that the environment 104 transitioned into.

Using a look-ahead search to control an agent may be referred to as the "MuZero" technique and is described in more detail in Julian Schrittwieser, et al. *Mastering Atari, Go, Chess and Shogi by Planning with a Learned Model. Nature,* 588(7839):604-609, 2020, the entire contents are hereby incorporated herein in their entirety. Particular reference may be made to the MuZero algorithm described at section 3 (also in Schrittwieser, et al. arXiv:1911.08265).

Figure 2:
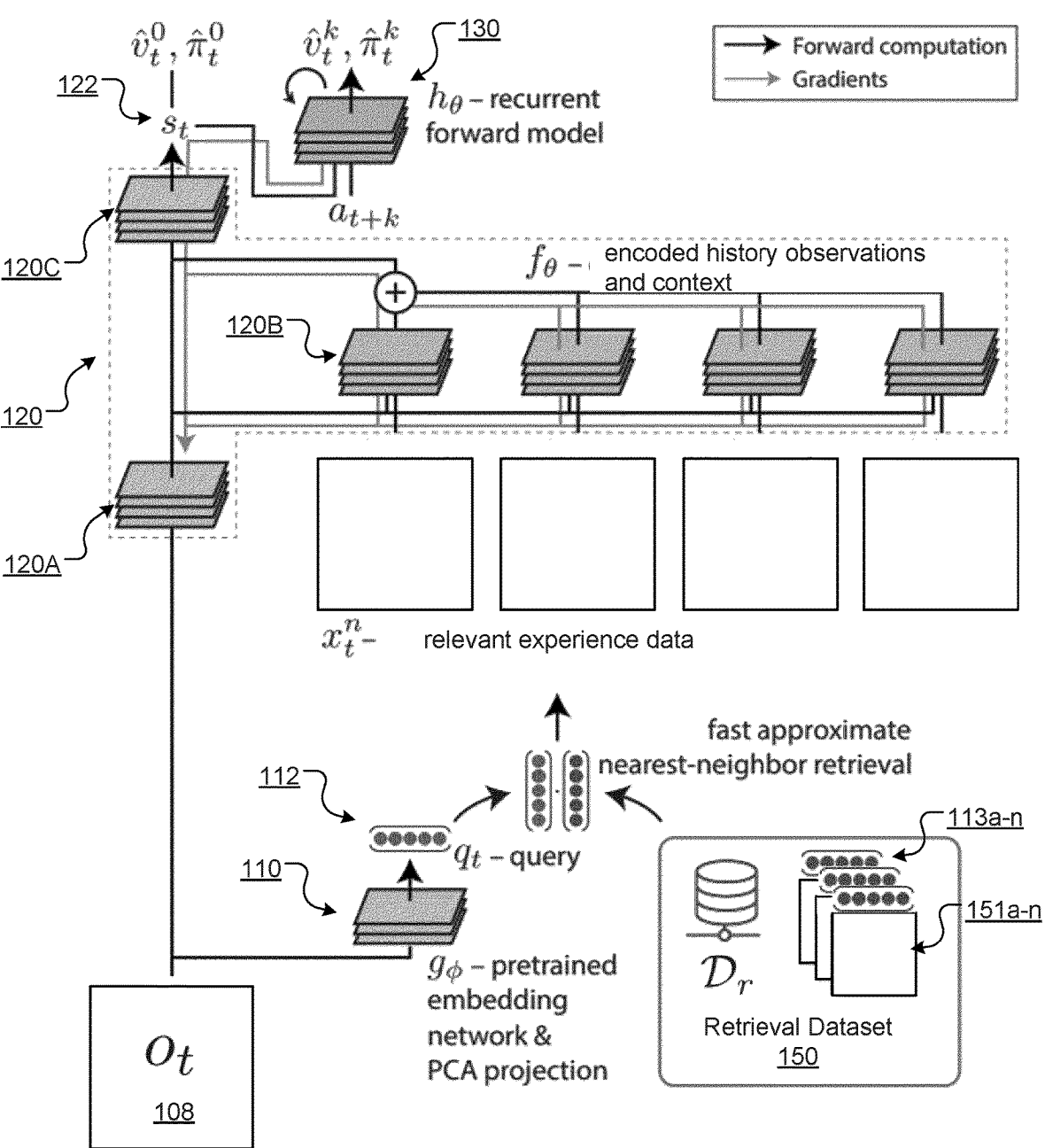
FIG. 2 is an example illustration of operations performed by the reinforcement learning system of FIG. 1.

FIG. 2 is an example illustration of operations performed by the reinforcement learning system 100 of FIG. 1. In general the system can perform these operations in response to receiving a current observation 108 that characterizes a current state of the environment 104 that corresponds to a current time step t.

The system processes the current observation 108 using the embedding neural network 110 to generate an embedding and then uses the embedding to generate a query vector 112. The embedding neural network 110 can be implemented with any appropriate neural network architectures. In particular, the embedding neural network 110 can be a feed-forward neural network that includes any appropriate neural network layers (e.g., fully-connected layer, convolutional layers, attention layers, etc.) in any appropriate numbers (e.g., 5, 10, or 100 layers) and arranged in any appropriate configuration (e.g., as a linear sequence of layers, either with or without residual connections). An embedding of an observation can refer to a representation of the observation as an ordered collection of numerical values, e.g., a vector or matrix of numerical values.

The embedding can be the activation output of an intermediate layer in the embedding neural network 110, or a combination of the activation outputs of two or more layers in the embedding neural network 110. In some cases, the embedding is directly used as the query vector 112 while in other cases, the embedding is further processed to generate the query vector 112. For example, the system 100 can apply a linear projection to the embedding using principal component analysis or another dimensionality reduction technique (e.g., non-negative matrix factorization, linear discriminant analysis, etc.) to reduce the dimensionality of the embedding. The projected embedding can then be used as the query vector 112.

As mentioned above, the retrieval dataset 150 stores each history observation from a plurality of history observations 151a-n in associated with a corresponding key vector 113a-n. The embedding neural network 110 is also used to generate these key vectors 113a-n. Like how the query vector 112 is generated, the system 100 pre-processes (i.e., prior to controlling the agent 102 to perform any tasks) each history observation using the embedding neural network 110 to generate an embedding and then uses the embedding to generate the corresponding key vector 113.

The system 100 selects one or more history observations from the retrieval dataset 150 by using the query vector 112 for the current observation 108 and the respective key vectors 113a-n for the plurality of history observations 151a-n. In particular, this can include computing, for each history observation stored within the retrieval dataset 150, a respective distance between the respective key vector for the history observation and the query vector 112 for the current observation 108, and then identifying one or more key vectors based on the respective distances, e.g. identifying (approximate) nearest-neighbors. Accordingly, the one or more history observations associated with identified key vectors can be selected. For example, the system can select one or more key vectors that have the smallest distances to the query vector 112 or that satisfy a distance threshold, and the distance can be a Euclidean distance, a Hamming distance, or other type of distance. In this way, the system 100 can select, as relevant history observations, a relatively small number of, e.g., four (as illustrated in FIG. 2) or another number smaller than ten, history observation from the retrieval dataset 150 that are most relevant to the current observation 108.

The system 100 provides the current observation 108 and the one or more selected history observations together with their associated context as input to encoder neural network 120 and then uses the encoder neural network 120 to process the input to generate a latent space representation 122 for the current state of the environment. Merely as one example, the encoder neural network 120 can generate embeddings of the one or more selected history observations and their associated context and combine these in a permutation invariant way, e.g. by summing them, and can then concatenate the combination with an embedding of the current observation 108.

Like the embedding neural network 110, the encoder neural network 120 can be implemented with any appropriate neural network architectures that enable it to map an input to a latent space representation. In the example of FIG. 2, the encoder neural network 120 includes a first sub network 120A, a second sub network 120B, and a third sub network 120C. A sub network of a neural network refers to a group of one or more neural network layers in the neural network. Each sub network can include, e.g., one or more fully-connected layer, one or more convolutional layers, one or more attention layers, one or more residual blocks, etc. The techniques described herein are not limited to the use of any particular neural network architecture. For example an observation including an image may be processed by fully-connected layer(s), convolutional layer(s), layer(s), and or using residual block(s).

As illustrated, the first sub network 120A processes the current observation 108 to generate a first encoded representation. The second sub network 120B processes each of the four selected history observations and its respective associated context to generate a respective second encoded representation. The third sub network 120C processes the first encoded representation and a combination, e.g., sum or average, of the respective second encoded representations to generate the latent state representation $S_t$ 122.

The system 100 provides the latent state representation $S_t$ 122 as input to the policy neural network 130 and then uses the policy neural network 130 to process the input to generate a policy output $\pi_t$ and, optionally, a value output $v_t$ which can then be used to select the action to be performed by the agent at the current time step t.

In the example of FIG. 2, the policy neural network 130 is a recurrent neural network that includes one or more recurrent layers, e.g., long short-term memory (LSTM) layers or gated recurrent unit (GRU) layers, followed by a policy head to provide the policy output and a value head to generate the value output. The policy head and value head can each be a respective feed-forward neural network.

The policy neural network 130 processes the latent state representation 122 at the current time step t to update a current hidden state of the policy neural network 130, i.e., to modify the current hidden state of the policy neural network 130 that has been generated by processing previous inputs state representations at one or more previous time steps, and then processes the updated current hidden state by the policy head to provide the policy output and by the value head to generate the value output.

Prior to using the neural networks to control the agent 102 to perform the specified task, the reinforcement learning system 100 or another training system trains the embedding neural network 110, the encoder neural network 120, and policy neural network 130 on a training dataset for the specified task, i.e., so that the embedding neural network 110 can be used to generate query vectors 112 that enable selection of highly relevant and informative relevant experience data 152 from the retrieval dataset 150, and that the encoder neural network 120 and policy neural network 130 can effectively utilize the relevant experience data 152 to enable selection of actions that can lead to successful completion of the specified task. In some cases, the training dataset is the same as the retrieval dataset 150 while in other cases, the training dataset is different, e.g., includes fewer observations, than the retrieval dataset 150.

More generally, the training dataset stores a plurality of transitions generated as a result of the agent 102 (or another agent) interacting with the environment 104 (or another instance of the environment). Each transition includes (1) a current observation characterizing the current state of the environment at one time; and, optionally, one or more of: (2) a current action performed by the agent in response to the current observation; (3) a next observation characterizing the next state of the environment after the agent performs the current action, i.e., a state that the environment transitioned into as a result of the agent performing the current action; or (4) a reward received in response to the agent performing the current action. As one example, each transition can include (1)-(3) or (1)-(4) as a tuple of data elements.

Figure 3:
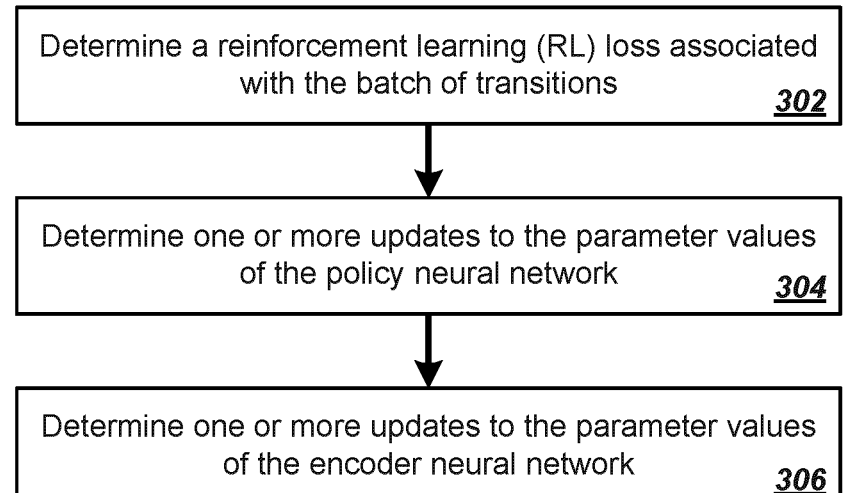
FIG. 3 is a flow diagram of an example process for training an encoder neural network and a policy neural network.

FIG. 3 is a flow diagram of an example process 300 for training an encoder neural network and a policy neural network. For convenience, the process 300 will be described as being performed by a system of one or more computers located in one or more locations. For example, a reinforcement learning system, e.g., the reinforcement learning system 100 of FIG. 1, appropriately programmed, can perform the process 300.

The system can continue performing iterations of the process 300 to train the encoder neural network and the policy neural network by using different batches of transitions sampled from the training dataset at different iterations of the process 300 until termination criteria for the training of the neural networks have been satisfied, e.g., until the parameters have converged, until a threshold amount of wall clock time has elapsed, or until a threshold number of iterations of the process 300 have been performed. In some cases, the system distributes the training across multiple computing units.

For each transition included in the batch, the system processes an encoder network input that includes a current observation included in the transition, and determines a reinforcement learning (RL) loss associated with the batch of transitions (step 302). The encoder network input can also include one or more selected history observations and their respective associated context selected from the retrieval dataset by using a nearest neighbor retrieval process based on the current observation included in the batch.

The RL loss can generally be determined using any of a variety of offline RL techniques. For example, the system can use an offline actor-critic technique described in Sergey Levine, et al. Offline reinforcement learning: Tutorial, review, and perspectives on open problems. arXiv preprint arXiv:2005.01643, 2020, where the policy neural network is configured as the actor and/or the critic. As another example, the system can use a value iteration technique described in Martin Riedmiller. Neural fitted q iteration—first experiences with a data efficient neural reinforcement learning method. In European conference on machine learning, pages 317-328. Springer, 2005, where the policy neural network is configured as a Q neural network. As yet another example, the system can use a model-based technique, e.g. as adopted by the MuZero technique. A model-based reinforcement learning technique can be one in which a model, e.g. a neural network, predicts a future state of the environment that can then be used for selecting an action rather than predicting an action directly.

The system can also apply any of a variety of regularization techniques during the RL training of the system to improve network robustness to irrelevant or poor quality history observations that might be selected. For example, the system can randomly zero-out a subset of retrieved history observations during training. As another example, the system can randomly replace a subset of retrieved history observations with the history observations selected for a different observation. As yet another example, the system can add to the RL loss a regularization loss, e.g., a mean-squared-error loss, which is used to regularize the embedding generated for a retrieved history observation toward the embedding generated for the current observation.

The system determines, based on a gradient of the RL loss computed with respect to the parameters of the policy neural network, one or more updates to the parameter values of the policy neural network to train policy neural network to optimize the RL loss (step 304). The system can determine the update by applying an optimizer to the gradient, e.g., an Adam optimizer, an rmsProp optimizer, or stochastic gradient descent optimizer, that is appropriate for the training of the policy neural network.

The system also determines, by virtue of backpropagating the gradient of the RL loss into the encoder neural network, one or more updates to the parameter values of the encoder neural network (step 306).

Because the nearest neighbor retrieval process is non-differentiable, which means that the query and key vectors mappings cannot be trained end-to-end directly, rather than jointly learning parameter values of the embedding neural network during the RL training, the system 100 can instead pre-train the embedding neural network 110, e.g., either as a stand alone neural network or as a part of another larger neural network, on the training dataset, and then use the pre-trained embedding neural network 110 to generate the query and keys that will subsequently be used in the process 300 to perform RL training of the encoder neural network 120 and policy neural network 130. For example, the system 100 can train an action selection policy model, e.g. using the MuZero technique, (i.e., without the retrieval process) on the transitions stored in the training dataset, and then take (a part of) the trained action selection policy model as the embedding neural network 110, e.g. a part the trained action selection policy model between an input layer and an intermediate layer before a policy output layer of the model.

FIG. 4 is a flow diagram of an example process 400 for controlling a reinforcement learning agent in an environment to perform a task. For convenience, the process 400 will be described as being performed by a system of one or more computers located in one or more locations. For example, a reinforcement learning system, e.g., the reinforcement learning system 100 of FIG. 1, appropriately programmed, can perform the process 400.

The system maintains a retrieval dataset that stores a plurality of history observations and, for each history observation, a corresponding associated context and a corresponding key vector (step 402). The key vectors are generated by using an embedding neural network based on the history observations. The retrieval dataset can be generated from experience data generated as a consequence of the agent or another agent was performing the same or different task(s) in the same or different environment(s).

Each history observation characterizes a respective history state of the environment. As described above, the respective associated context for each history observation can include any information that is relevant to a specified task that the agent was performing, but may nevertheless be not readily apparent from the history observation itself, among other information.

In general the system can repeatedly perform the following steps 404-410 of process 400 at each of multiple time steps to select a respective action (referred to as the "current" action below) to be performed by the agent at a respective state of the environment (referred to as the "current" state below) that corresponds to the time step (referred to as the "current" time step below).

The system receives a current observation characterizing the current state of the environment at the current time step (step 404). For example, the current observation can include an image, a video frame, an audio data segment, a sentence in a natural language, or the like. In some of these examples, the observation can also include information derived from the previous time step, e.g., the previous action performed, a reward received at the previous time step, or both.

The system selects one or more history observations from the plurality of history observations (step 406). Step 406 is explained in more detail with reference to FIG. 4, which shows sub-steps 502-508 of the step 406.

The system processes the current observation using the embedding neural network to generate an embedding and then uses the embedding to generate the query vector (step 502). In some implementations, the embedding can be the activation output of an intermediate layer in the embedding neural network that has been generated based on processing the current observation, and the query vector is a projected embedding that is generated by applying a linear projection to the embedding.

The system selects the one or more history observations from the plurality of history observations using a vector similarity search technique based on the query vector (step 504), e.g. base on a vector similarity between the query vector and a key vector for a history observation. The vector similarity can be an inner product e.g. a dot product or cosine similarity.

More specifically, this can include computing, for each history observation stored within the retrieval dataset, a respective distance between the respective key vector for the history observation and the query vector for the current observation, and then selecting, from among the key vectors associated with the plurality of history observations, one or more key vectors based on their respective distances from the query vector for the current observation (step 506), e.g. selecting the closest.

This can be done by using a maximum inner product search technique (MIPS) to compute the inner product of the query vector with the key vectors to identify query-key vector pairs having the largest, or maximum, inner products (i.e., closest distance or, put another way, highest similarity). For example, the system identifies one or more key vectors that have the smallest distances, e.g., a Euclidean, Hamming, or other type of distance, from the query vector, or one or more key vectors that satisfy a distance threshold.

When a large number of, e.g., one million, ten million, one billion, or more, history observations are stored in the retrieval dataset, however, computation of the inner products between a query vector and the respective key vectors for the history observations is slow and processor resource intensive. Some implementations of the system thus use an approximate nearest neighbor matching technique, i.e., instead of a brute-force method, to enable faster computation time while retaining a high level of accuracy. For example, the system can use search space pruning, quantization for the MIPS, or both. As a particular example of quantization technique, the system can use an anisotropic quantization-based MIPS technique descried in more detail at Ruiqi Guo, et al. "Accelerating large-scale inference with anisotropic vector quantization." International Conference on Machine Learning. PMLR, 2020. In anisotropic quantization-based MIPS the inner product is computed using a quantized query, and has an anisotropic weighting that more greatly penalizes an error parallel with than orthogonal to a key.

The system then selects, as the one or more selected history observations, the corresponding history observations from among the plurality of history observations in the retrieval dataset that are associated with the one or more selected key vectors (step 508).

The system processes, using an encoder neural network and in accordance with the parameters values of the encoder neural network, an encoder network input that includes (i) the current observation and (ii) the one or more selected history observations and their respective associated context to generate a latent state representation for the current state of the environment (step 508).

The system uses the latent state representation to determine an action to be performed by the agent in response to the current observation (step 410). In some implementations, the system processes the latent state representation using the policy neural network to generate a probability values for each action in a set of possible actions that can be performed by the agent, and then uses the probability values to select the action to be performed by the agent, e.g., by sampling an action in accordance with the probability values for the actions, or by selecting the action with the highest probability value. In some other implementations, the system performs a look-ahead search that involves performing a plurality of planning iterations guided by the policy neural network, and then selects the action based on the results of the look-ahead search, i.e., after that last planning iteration.

Figure 6:
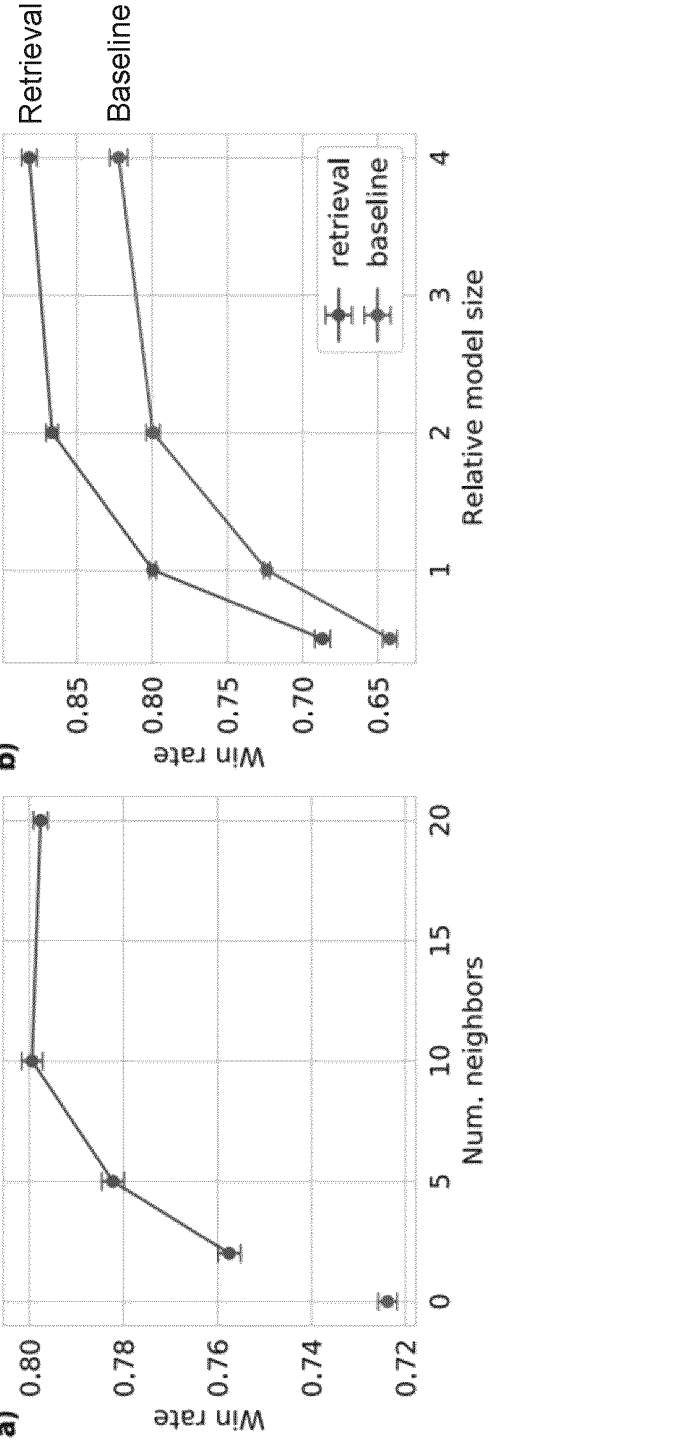
FIG. 6 shows a quantitative example of the performance gains that can be achieved by an agent controlled using the reinforcement learning system described in this specification.

FIG. 6 shows a quantitative example of the performance gains that can be achieved by an agent controlled using the reinforcement learning system described in this specification. In the example of FIG. 6, the environment is a simulated (or virtual) environment and the agent is a computerized agent implemented as one or more computer programs competing against a reference opponent agent to accomplish a goal, where the actions in the set of actions are possible actions that can be performed by the computerized agent and the goal is to win the competition against the reference opponent agent.

FIG. 6($a$) shows the win rate against the reference opponent agent when the actions to be performed by the agent are selected by the reinforcement learning system 100 based on varying numbers (5, 10, 15, and 20) of retrieved history observations, and the win rate against the reference opponent agent when the actions to be performed by the agent are selected by a baseline, non-retrieval agent control system (that is, based on no retrieved history observation).

FIG. 6($b$) shows the win rate as a function of model size (defined as a multiple of a model component, e.g., a convolution or attention block, that is repeated multiple times throughout the policy neural network) of a retrieval-augmented policy neural network or a baseline, non-retrieval policy neural network.

It can be appreciated that, the retrieval process improves the win rate against the same, fixed reference opponent agent, and also leads to a performance boost compared to baseline, non-retrieval policy neural network of the same capacity.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a JAX framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for controlling an agent in an environment to perform a task, the method comprising:

maintaining a retrieval dataset that stores a plurality of history observations and, for each history observation, a respective associated context, wherein each history observation characterizes a respective history state of the environment and the respective associated context for each history observation characterizes one or more actions that were performed in response to the history observation;

receiving a current observation characterizing a current state of the environment;

selecting one or more history observations from the plurality of history observations, comprising:

generating a query vector for the current observation, comprising:

processing the current observation using an embedding neural network to generate an embedding and processing the embedding to generate the query vector, and selecting the one or more history observations from the plurality of history observations using the query vector; and processing, using an encoder neural network and in accordance with current values of encoder network parameters, an encoder network input comprising (i) the current observation and (ii) the one or more selected history observations and their respective associated context to generate a latent state representation for the current state of the environment;

processing, by a policy neural network, an input that comprises the latent state representation generated by the encoder neural network to generate a policy network output; and determining an action to be performed by the agent in response to the current observation based on the policy network output.

2. The method of claim 1, wherein the associated context of each history observation comprises one or both of: a history action performed in response to the history observation, or a history reward received in response to the history action being performed.

3. The method of claim 1, wherein the associated context of each history observation further comprises one or both of: a history final observation characterizing a terminal state in a trajectory that includes the history observation, a history final reward received by the agent in the trajectory that includes the history observation.

4. The method of claim 1, wherein processing the embedding to generate the query vector comprises:

processing the embedding by using principal component analysis.

5. The method of claim 1, wherein each history observation stored in the retrieval dataset is associated with a corresponding key vector that is generated by using the embedding neural network.

6. The method of claim 5, wherein selecting the one or more history observations from the plurality of history observations comprises:

selecting, from among the key vectors associated with the plurality of history observations, one or more key vectors based on their respective distances from the query vector for the current observation; and selecting, as the one or more selected history observations, corresponding history observations from the plurality of history observations that are associated with the one or more selected key vectors.

7. The method of claim 6, wherein selecting the one or more key vectors comprises:

selecting one or more key vectors having smallest Euclidean distances from the query vector for the current observation.

8. The method of claim 1, wherein selecting the one or more history observations from the plurality of history observations using the query vector comprises using an approximate nearest neighbor matching technique.

9. The method of claim 1, wherein selecting the one or more history observations from the plurality of history observations using the query vector comprises using a vector similarity search technique.

10. The method of claim 9, wherein the vector similarity search technique comprises a maximum inner product search technique.

11. The method of claim 9, wherein the maximum inner product search technique comprises an anisotropic quantization-based maximum inner product search technique.

12. The method of claim 1, wherein some or all of the plurality of history observations stored in the retrieval dataset are generated as a result of the agent performing one or more different tasks when interacting with the environment.

13. The method of claim 1, wherein some or all of the plurality of history observations stored in the retrieval dataset each have a different dimension, a different modality, or both than the current observation.

14. The method of claim 1, wherein determining the action to be performed by the agent in response to the current observation comprises:

performing a look-ahead search that begins from the current state and searches through a latent state representation space guided by the policy network output and additional policy network outputs of the policy neural network, wherein the policy neural network is configured to, at each of multiple time steps, process a respective latent state representation for the time step to generate a corresponding additional policy network output for the time step.

15. The method of claim 14, wherein the look ahead search comprises a Monte-Carlo Tree Search (MCTS) technique.

16. The method of claim 1, wherein the policy network output comprises one or both of:

a predicted policy output that defines a score distribution over a set of possible actions; or a predicted value output that defines a value representing a predicted long-term reward received by the agent as a result of the environment being in the current state.

17. The method of claim 1, wherein determining the action to be performed by the agent in response to the current observation comprises:

selecting, from the set of possible actions, the action to be performed by the agent by using the policy network output of the policy neural network.

18. The method of claim 1, wherein the task comprises one of: an object manipulation task or an environment navigation task.

19. The method of claim 1, wherein the agent is a mechanical agent, the environment is a real-world environment, and the observation comprises data from one or more sensors configured to sense the real-world environment.

20. The method of claim 1, wherein the encoder neural network comprises:

a first sub network configured to process the current observation to generate a first encoded representation;

a second sub network configured to process each of the one or more selected history observations and its respective associated context to generate a respective second encoded representation; and a third sub network configured to process the first encoded representation and the respective second encoded representations to generate the latent state representation.

21. The method of claim 1, wherein the encoder neural network has been trained through reinforcement learning on a training dataset that stores a plurality of trajectories generated as a result of the reinforcement learning agent interacting with the environment.

22. The method of claim 21, wherein the retrieval dataset is the same as the training dataset.

23. The method of claim 21, wherein the retrieval dataset is different from the training dataset and is larger than the training dataset.

24. The method of claim 21, wherein the encoder neural network has been trained through model-based reinforcement learning.

25. One or more non-transitory computer storage media storing instructions that when executed by one or more computer cause the one or more computers to perform operations for controlling an agent in an environment to perform a task, the operations comprising:

maintaining a retrieval dataset that stores a plurality of history observations and, for each history observation, a respective associated context, wherein each history observation characterizes a respective history state of the environment and the respective associated context for each history observation characterizes one or more actions that were performed in response to the history observation;

receiving a current observation characterizing a current state of the environment;

selecting one or more history observations from the plurality of history observations, comprising:

generating a query vector for the current observation, comprising:

processing the current observation using an embedding neural network to generate an embedding and processing the embedding to generate the query vector, and selecting the one or more history observations from the plurality of history observations using the query vector; and processing, using an encoder neural network and in accordance with current values of encoder network parameters, an encoder network input comprising (i) the current observation and (ii) the one or more selected history observations and their respective associated context to generate a latent state representation for the current state of the environment;

processing, by a policy neural network, an input that comprises the latent state representation generated by the encoder neural network to generate a policy network output; and determining an action to be performed by the agent in response to the current observation based on the policy network output.

26. A system comprising one or more computers and one or more storage devices storing instructions that when executed by the one or more computers cause the one or more computers to perform operations for controlling an agent in an environment to perform a task, the operations comprising:

maintaining a retrieval dataset that stores a plurality of history observations and, for each history observation, a respective associated context, wherein each history observation characterizes a respective history state of the environment and the respective associated context for each history observation characterizes one or more actions that were performed in response to the history observation;

receiving a current observation characterizing a current state of the environment;

selecting one or more history observations from the plurality of history observations, comprising:

generating a query vector for the current observation, comprising:

processing the current observation using an embedding neural network to generate an embedding and processing the embedding to generate the query vector, and selecting the one or more history observations from the plurality of history observations using the query vector; and processing, using an encoder neural network and in accordance with current values of encoder network parameters, an encoder network input comprising (i) the current observation and (ii) the one or more selected history observations and their respective associated context to generate a latent state representation for the current state of the environment;

processing, by a policy neural network, an input that comprises the latent state representation generated by the encoder neural network to generate a policy network output; and determining an action to be performed by the agent in response to the current observation based on the policy network output.

* * * * *